United States Patent [19]
Plocus et al.

[11] Patent Number: 5,568,974
[45] Date of Patent: Oct. 29, 1996

[54] LIQUID MIXING DEVICE

[75] Inventors: Van G. Plocus, Punxsutawney; Chris Forsha, Blairsville, both of Pa.

[73] Assignee: Vapco Engineering, Punxsutawney, Pa.

[21] Appl. No.: 584,556

[22] Filed: Jan. 11, 1996

[51] Int. Cl.$^6$ .................................................. B01F 15/02
[52] U.S. Cl. .................. 366/151.1; 137/114; 366/158.5; 366/174.1
[58] Field of Search ............................. 366/151.1, 152.1, 366/152.5, 160.1, 182.1, 158.5, 154.1, 162.1, 167.1, 171.1, 174.1, 177.1; 137/114, 605

[56] References Cited

U.S. PATENT DOCUMENTS

| | | |
|---|---|---|
| 843,080 | 2/1907 | Ermentrout . |
| 3,099,283 | 7/1963 | Holdeman et al. . |
| 3,116,749 | 1/1964 | Waugh ..................................... 137/114 |
| 4,197,809 | 4/1980 | Johnson . |
| 4,589,777 | 5/1986 | Soler ..................................... 366/151.1 |
| 4,865,068 | 9/1989 | Mellen ..................................... 137/114 |

OTHER PUBLICATIONS

"Coolspring Water Treatment, Inc.", R.D. 1, Box 324, Summerville, PA 15864 (hand-out).
"Automatic Caustic Treatment System", prepared by Vapco Engineering, Punxsutawney, PA (drawing).

Primary Examiner—Robert W. Jenkins
Attorney, Agent, or Firm—Hudak & Shunk Co. L.P.A.

[57] ABSTRACT

A fluid mixing device comprises a housing provided with fluid entry ports for fluids being treated, and for treatment fluids, as well as a fluid discharge port for the discharge of treated fluids. A compound valve arrangement is positioned in the entry port, comprising one valve for adjusting the amount of treatment fluids entering the mixing device, and in series therewith a toggle valve actuated by a rod attached to the toggle valve which extends into the housing and which is actuated by the impact of fluids passing through the device. The mixing device is particularly suited to the neutralization of mine waste waters with caustic soda and for the introduction of polymer flocculents to induce the settling of solids in liquid suspension.

16 Claims, 1 Drawing Sheet

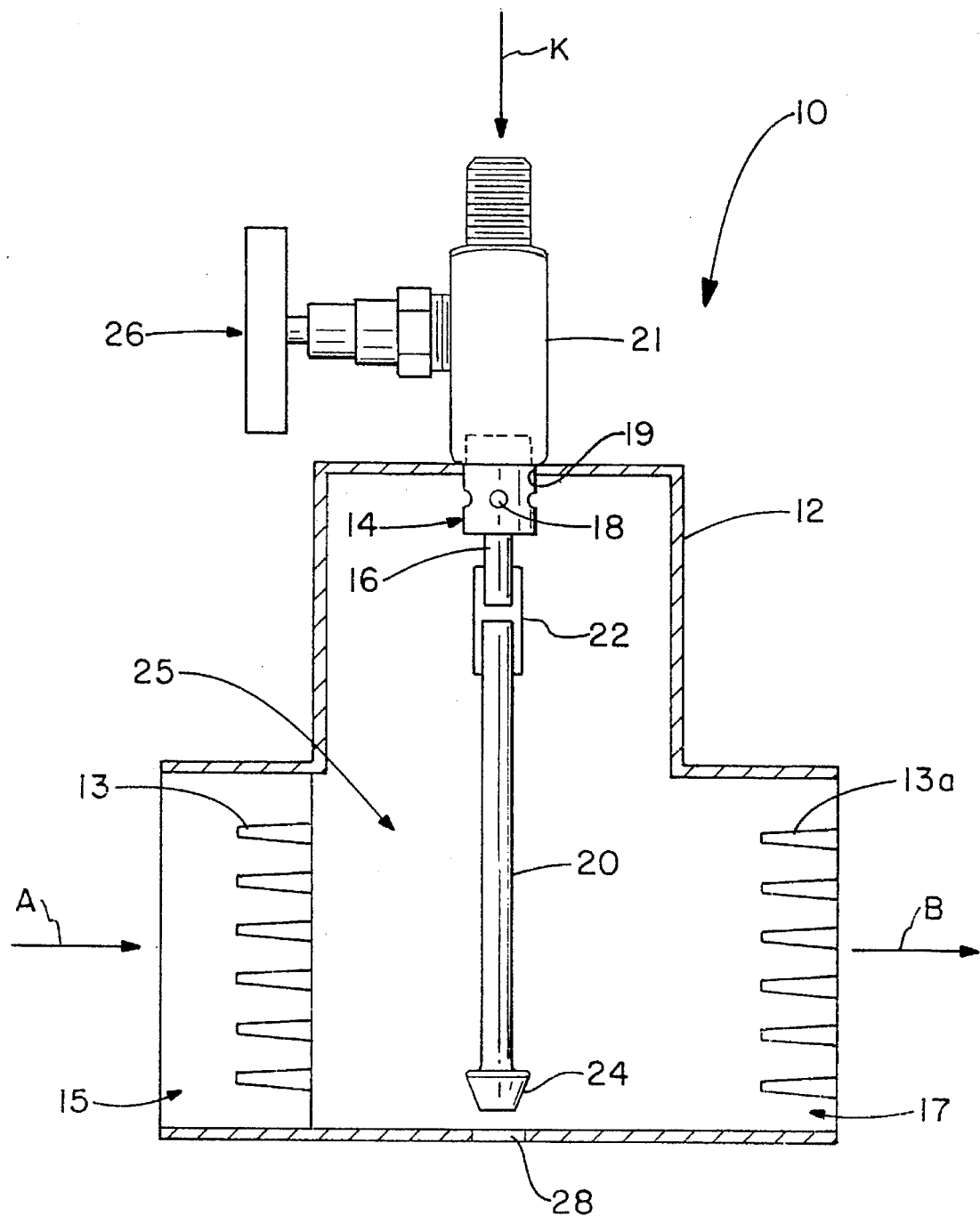

LIQUID MIXING DEVICE

FIELD OF THE INVENTION

This invention relates to automatic fluid mixing devices. More particularly, this invention relates to enclosed devices designed to mix fluids passing therethrough safely. Specifically, this invention relates to automatic fluid mixing devices in which the component fluids passing through the device are intimately mixed in a way that facilitates the homogeneity of the components being mixed following their mixing.

BACKGROUND OF THE INVENTION

Industrial activities frequently involve a need to chemically interact liquids with each other. For example, it is oftentimes necessary to combine a liquid stream with another liquid, either to synthesize a new chemical product by chemical reaction, or in some instances, to render noxious liquids substantially harmless. In still other cases, liquids are combined to achieve a physical effect, as in the case where polymeric flocculents are added to, for example, sewage wastes in the process of their treatment.

In the case of the mining industry, for instance, it is commonly necessary to chemically treat mine seepage to control pH and precipitate dissolved metals prior to discharge. In such cases, sulfur-bearing rock formations are frequently associated with the mine geology, and these are subject to leaching by acidic water seeping into the mine through the overlying strata. As a consequence, such seepage often becomes contaminated with sulfur-containing acids as it passes through sulfidebearing strata, for example, geological formations containing pyritic sulfur, making it undesirable, if not illegal to discharge the seepage wastes into the environment without first neutralizing the contaminating sulfurous materials. As indicated, these are typically acidic in nature, creating a hazard to plant and animal life with which such seepage comes in contact, either directly or indirectly.

As a consequence, and in order to comply with state and federal environmental and mining regulations, it has been become commonplace to introduce a neutralizing material, such as for instance, liquid caustic soda to such wastes to facilitate the precipitation of metals before before releasing the wastes to the environment.

One method for treating mine seepage wastes involves collecting the wastes in an intermediate storage tank prior to treatment. Thereafter, following filling of the tank to a predetermined level, a portion of the tank's contents are automatically syphoned from the tank, activating a caustic-dispensing, spring-loaded valve by impact of the syphoning stream against the valve actuating mechanism. Caustic soda introduced through the actuated valve mixes with the wastes, which then travel through an open mixing trough during a reaction process between the waste and the caustic, the neutralized stream ultimately being deposited, for instance, in a waste water storage and settling pond. While the system described can be successfully employed to treat the wastes, it has the distinct disadvantage of risking inadvertent contact of those in the vicinity of the treatment equipment with hazardous materials during the treatment process.

Another method of neutralization involves passing the acid wastes over sodium carbonate briquettes; however, this process suffers from the fact that the briquettes are somewhat hazardous materials, in addition to which, the reaction rate and the amount of treatment are difficult to control, and the operation is relatively labor intensive.

BRIEF SUMMARY OF THE INVENTION

In view of the foregoing, therefore, it is a first aspect of this invention to provide a device for combining liquid materials.

It is a second aspect of this invention to provide a totally enclosed mixing device for chemically reactive liquid materials.

An additional aspect of this invention is to provide a device and an associated process for rendering hazardous and toxic liquid materials safe for discharge to the environment.

A further aspect of this invention is to provide an adjustable mixing device for combining liquids in appropriate stoichiometric amounts.

Another aspect of this invention is to provide a mixing device for automatically combining liquid streams of reactive materials as they pass through the device.

A still further aspect of this invention is to provide a device for the non-hazardous mixing of mine seepage liquids with materials whose combination with such liquids results in their neutralization and/or settling.

Yet an additional aspect of this invention is to provide a mixing device for liquids that facilitates their mixing in ratios that result in their neutralization.

The preceding and still further aspects of the invention are provided by a device for mixing fluids. The device comprises a housing wherein mixing of the fluids takes place and which has a fluid entry port for a first fluid, and a fluid exit port. A first valve is also included that extends into the housing, providing an entry point into a mixing chamber within the housing for admitting a second fluid, the first and second fluids being mixed in the chamber before being discharged through the fluid exit port. The device also includes first valve actuating means, activated by the flow of fluids through the mixing chamber, as well as a second valve for controlling the flow of fluid to the first valve.

The preceding and still other aspects of the invention are provided by a process for neutralizing acidic fluids in an enclosed fluid mixing device. The device includes a housing enclosing a mixing chamber that is provided with a port for the entry of acidic fluids and/or fluids containing highly suspended solids, and an exit port for the discharge of neutralized or treated fluids.

A first valve extends into the housing, providing an entry point for introduction of basic fluid materials and/or flocculating agents into the mixing chamber, the acidic materials being mixed with the basic fluid materials and/or agents and neutralized in the chamber. The device also includes first valve actuating means activated by the flow of fluids through the chamber, and a second valve for manually controlling the flow of basic fluids and/or agents to the first valve.

BRIEF DESCRIPTION OF THE DRAWING

The invention will be better understood when reference is had to the drawing, which shows a semi-schematic representation of the liquid mixing device of the invention.

DETAILED DESCRIPTION OF THE INVENTION

The FIGURE represents a semi-schematic drawing of the liquid mixing device of the invention, generally 10. The device comprises a housing 12 which serves as a mixing chamber, advantageously provided with baffles 13 at an entry point 15 of the housing 12, and additional baffles 13a at an exit port 17 of the housing.

An entry point 19 is also provided in the housing 12 through which a valve arrangement, generally 26, extends. The valve arrangement 26 comprises a body portion 21 of a needle valve, or its equivalent, at the lower end of which is located in series a toggle valve, generally 14, through which neutralizing fluids enter the housing 12 through a series of orifices 18. The toggle valve 14 also includes a toggle mechanism 16 which actuates the valve and allows fluids (not shown) to entry the housing 12.

A toggle valve mechanism actuating rod 20 is attached to the toggle mechanism 16 preferably by a flexible coupling 22. An actuating rod augmentation attachment 24 can also be fastened to the lower end of the mixing device actuating rod 20, if desired. A drain port 28 is advantageously located at the lower portion of the housing to provide relief for potentially valve-damaging increases in pressure within the mixing device.

As previously indicated, the mixing device is particularly useful in the neutralization of acidic mine wastes. In such uses, mine wastes enter the mixing device in the direction of the arrow "A", being mixed in the interior 25 of the housing 12, which serves as a mixing chamber, with a neutralizing fluid and/or flocculating agents entering the mixing device in the direction "C", the neutralized mixture exiting the mixing device in the direction "B", following neutralization of the acidic material.

While the application of the liquid mixing device 10 has been described in connection with the neutralization of acidic materials, for example, acidic mine wastes, it can also be used for the commingling of any fluids reactive with each other, and it can also be successfully employed in connection with the mixing of fluids in which the reaction is not chemical but rather physical, as for instance, in the case of introducing flocculating agents, for example, polymeric floculents in order to assist the settling of suspended material in the introduced fluids.

In the case of the neutralization of acidic fluids such as mine wastes, the neutralizing agent added through valve 26 can be any basic liquid such as solutions of caustic soda, potassium hydroxide, or others. Since such materials are corrosive, and in view of the fact that the wastes being treated are acidic in nature, an advantage of the liquid mixing device of the invention is that the mixing of the potentially hazardous materials occurs in an enclosed apparatus, eliminating the danger of inadvertent contact with the materials.

The shape of the housing within which mixing takes place is relatively unimportant; however, it has been found to be particularly advantageous to employ a housing having a "Tee" configuration since such a configuration lends itself well to the introduction of the neutralizing fluids, as well as the materials being treated. In the case of such a mixing device, the neutralizing fluid advantageously enters the branch portion 19 of the Tee.

If desired, and in the preferred embodiment of the invention, the housing can be provided with baffles 13 and 13a to enhance the mixing action of the fluids being combined, therefore assuring intimate commingling and substantially complete reaction in those cases where a chemical reaction is occurring between the introduced components. While baffles may take a variety of forms, it has been found that a simple grid pattern, as illustrated in the FIGURE is satisfactory since it provides superior mixing results, and since such baffles are relatively inexpensive; consequently, their use provides a preferred embodiment of the invention.

In the case of mine wastes, as well as in other chemical reactions, it is desirable to assure that relatively stoichiometric amounts of the materials being mixed enter the mixing device 12. As a consequence, and although other valves can be used for introducing the neutralizing agent at C, employment of a needle valve, particularly one manually adjusted, has been found to be especially useful since it can be accurately adjusted to introduce relatively exact amounts of the materials needed to neutralize the amount of acidic wastes entering at A. In conjunction with such needle valves, the invention comprehends the use of a further valve in series, in effect providing a compound valve arrangement, in the form of a toggle valve 14 which is actuated by the lateral displacement of a toggle mechanism 16, allowing fluids passing through the needle valve 26 to exit the toggle valve through orifices 18. Although other equivalent valves can be used, an example of a suitable toggle valve is that manufactured by Mono Flo International Inc. of McClean, Va., and marketed as a "Nipple Drinker" valve, Model No. 10094.

Actuation of the toggle operated valve 14 in the mixing device of the invention is accomplished by flow of the waste being treated, entering at A, impacting actuating rod 20, connected to the toggle mechanism 16 by a flexible coupling 22. The flexible coupling 22 can advantageously be a piece of elastomeric tubing of suitable length.

Since the flow of the liquid waste being treated varies with conditions, an advantage of the mixing device of the invention is that the valve 26 can be manually adjusted from time-to-time to correspond to changes in the operating conditions. Furthermore, and in cases where lower volumes of wastes are being treated, the effective impact area of the actuating rod 20 may be increased by addition of an augmentation device such as 24 which increases the area of the actuating rod 20 being impacted by the fluid entering at A. Such an augmentation device can simply be a ball screwed on the end of the actuating rod 20 or an equivalent device. Conversely, during periods of high flow of wastes entering the mixing device, the toggle valve 14 is protected by the fact that the flexible coupling 22 allows the actuating rod 20 to move further laterally without causing a corresponding movement in the toggle mechanism 16.

In a preferred embodiment of the invention, a drain port 28 is provided in order to accommodate increased pressure within the liquid device, for instance, in the event the liquids within the device were to freeze.

Any of a variety of materials can be used for fabricating the mixing device described in the preceding, for example, the housing can be made of plastic including polyolefins, polyvinyl chloride, or others. Similarly, plastics are also useful in fabricating the actuating rod 20 and the area augmentation devices 24. However, corrosion-resistant metals may also be used if desired.

In the case of the valves, metals resistant to corrosion, such as stainless steel and similar materials have been found to be particularly useful.

The dimensions of the components of the liquid measuring device will naturally depend on the flows being accommodated; however, commonly Tees having ratios of 4×4×4, 6×6×4, as well as other ratios are suitable. Where the preceding ratios define inches, a 1½" long by ¼" diameter flexible connecting tubing is suitable, while the actuating rod in such cases will be about ¼" in diameter and extend to near the bottom of the housing.

While in accordance with the patent statutes, a preferred embodiment and best mode has been presented, the scope of the invention is not limited thereto, but rather is measured by the scope of the attached claims.

What is claimed is:

1. A device for mixing fluids comprising:

a housing enclosing a mixing chamber, said chamber being provided with at least two fluid entry ports, and a fluid exit port;

first valve means extending into a first of said housing entry ports for entry of a first fluid into said mixing chamber, said first fluid being mixed in said mixing chamber with a second fluid entering a second of said housing entry ports, said mixture being discharged from said chamber through said exit port;

first valve actuating means, actuated by the flow of said second fluid through said chamber, for initiating the entry of said first fluid, and second valve means for controlling the flow of said first fluid to said first valve means, independently of the flow of said second fluid through said mixing device.

2. A device according to claim 1, in which first valve means includes a valve operated by a toggle mechanism forming a part thereof, said toggle mechanism being actuated by an actuating rod extending from said mechanism into said mixing chamber, said second fluid passing through said chamber impacting said rod, causing its lateral displacement and resultant actuation of said valve toggle mechanism.

3. A device according to claim 2, in which said actuating rod is attached to said toggle mechanism by means of a flexible linkage.

4. A device according to claim 3, in which said entry and exit ports are provided with baffle means to provide turbulence in fluids passing through said device.

5. A device according to claim 2, in which said actuating rod has an end attached to said toggle mechanism, and a free end, said free end being adapted to receive an augmentation attachment providing said rod with increased surface area exposed to impact with said second fluid flowing through said mixing chamber.

6. A device according to claim 4, in which said baffle means comprises grids located at said second entry port and the exit port.

7. A device according to claim 1, in which said second valve means is a needle valve.

8. A device according to claim 1, in which said housing is Tee shaped, and said first valve means extends into the Tee's branch portion.

9. A device according to claim 1, wherein said first fluid contains a flocculating agent.

10. A device for neutralizing acidic fluids in an enclosed mixing device comprising:

a housing enclosing a mixing chamber, said mixing chamber being provided with a port for entry of an acidic fluid, a port for entry of a neutralizing fluid, and an exit port for discharge of neutralized fluids;

first valve means communicating with said housing for entry of a fluid basic material into said chamber through one of said entry ports, said acidic fluid entering through another of said entry ports and being mixed with said basic material and neutralized in said chamber;

first valve actuating means activated by the flow of said acidic fluid through said chamber, said first valve means being connected in series with second valve means for controlling the flow of said fluid basic material to said mixing chamber, independently of the flow of said acidic fluid through the mixing device.

11. A device according to claim 10, in which said first valve means includes a valve operated by a toggle mechanism forming a part thereof, said toggle mechanism being actuated by an actuating rod extending from said mechanism into said mixing chamber, said acidic fluid passing through said chamber impacting said rod, causing its lateral displacement and resultant actuation of said valve toggle mechanism.

12. A device according to claim 11, in which said actuating rod is attached to said toggle mechanism through a flexible linkage.

13. A device according to claim 12, in which said entry and exit ports are provided with baffle means to provide turbulence in fluids passing through said housing.

14. A device according to claim 13, in which said second valve means is a needle valve.

15. A device according to claim 14, in which said acidic fluid is mine water waste and said basic fluid is caustic soda.

16. A device according to claim 15, in which said housing is Tee shaped, and said first valve means extends into the Tee's branch portion.

* * * * *